United States Patent [19]

Walther et al.

[11] Patent Number: 5,606,648

[45] Date of Patent: Feb. 25, 1997

[54] APPARATUS AND METHOD FOR MODULATING IMAGE SIGNALS IN A HIGH ADDRESSABILITY PRINTING MACHINE

[75] Inventors: Lawrence E. Walther, Macedon; Isaak Rivshin, Pittsford; Leon C. Williams, Walworth, all of N.Y.

[73] Assignee: Xerox Corporation, Stamford, Conn.

[21] Appl. No.: 352,404

[22] Filed: Dec. 8, 1994

[51] Int. Cl.$^6$ .......................... G06K 15/02; G06K 15/14; H04N 1/405; H04N 1/29
[52] U.S. Cl. .......................... 395/107; 395/109; 358/298; 358/300; 347/131; 347/254
[58] Field of Search ........................ 395/107, 109; 358/298, 300, 447, 456, 458, 459; 347/131, 254

[56] References Cited

U.S. PATENT DOCUMENTS

5,274,472  12/1993  Williams ........................ 358/455
5,495,341  2/1996  Kawana et al. ........................ 358/298

Primary Examiner—Scott A. Rogers
Attorney, Agent, or Firm—Gary B. Cohen

[57] ABSTRACT

A printing system is provided for printing an image on a substrate. The image is represented by a set of words with each word including M bits and being modulated so as to produce a single bit stream. The printing system includes a multi-phase clock generator, responsive to a clock signal with a first clock rate, for producing N phase signals and a data serializer, communicating with the multi-phase clock generator, for receiving the N phase signals and the word set. In operation, the data serializer processes each word of the word set, with the N phase signals, to produce the single bit stream, the single bit stream being outputted at a second clock rate with the second clock rate being greater than the first clock rate. The data serializer communicates with a print engine, the print engine receiving the single bit stream for imaging the image on the substrate.

28 Claims, 9 Drawing Sheets

*(Prior Art)*

FIG. 12

APPARATUS AND METHOD FOR MODULATING IMAGE SIGNALS IN A HIGH ADDRESSABILITY PRINTING MACHINE

The present invention relates generally to a technique for high addressability printing and more particularly, to an apparatus and method for modulating image data with a simple, yet effective high addressability modulator. Preferably, the high addressability modulator uses a single clock arrangement to modulate a word of M bits, inputted to the modulator at a given input clock rate, so as to produce a single bit stream with a clock rate that is greater than the given input clock rate.

Digital reproduction, transfer or display of original images on image output terminals begins by creating a digital representation of an original image. Commonly, the digital representation becomes a two-tone microstructure otherwise known as a bitmap. In such representations, multiple gray levels or gray densities in the original image are reproduced by varying the spatial frequency of halftone microstructures (or halftone cells/dots). Continuous tone images or image portions are typically represented in binary format by creating halftone cells or dots, where each cell represents a gray level density within an area of picture elements (pixels).

Methods of halftone digital image processing, encompassing the process steps of scanning or image acquisition through printing or display are known. In general, digital image output terminals (e.g. printers) are capable of creating spots within an area with a predetermined resolution (dots per unit area). In scanners, a single "spot" describes a multi-bit density response. Typically, input scanners may acquire density information at 256 levels of gray to describe a spot or pixel. By contrast, output terminals generally have two or another relatively small number of levels to reproduce image information. Output terminals commonly contend with excess scanned information by quantizing the image data through halftoning techniques, to represent the image as a halftone.

A continuing goal in the art is to develop output terminals, such as printers, with improved image quality. Physical constraints such as output terminal device resolution (spots per unit area) can be enhanced so as to increase perceived resolution without resorting to physical device resolution increases. Current technology improves device resolution without actually increasing dots per unit area. There are many advantages to increasing or controlling a printer's virtual (enhanced) resolution. The most evident advantage is a compatibility issue. Many printers have a physical resolution (or addressability) of 300 dots per inch (dpi), and by creating printers with greater physical resolutions such as 400 dpi, image emitters or document creators producing resolution dependent images at a particular resolution are no longer compatible. A solution to this problem is found by using device independent document (or image) descriptions such as Xerox Interpress and PostScript page description languages. Currently, however, other PDLs such as PostScript or HP-PCL, are not resolution independent.

A further limitation of higher resolution devices is hardware affordability. Physical memory requirements increase when device resolution increases, directly increasing the cost of a physical device. As a result of increased memory requirements for higher resolution devices, technology enhancing physical device resolution limitations (virtual resolution) are desirable additions to the physical device.

High addressability techniques use laser modulation or pulse width modulation to increase printer resolution without modifying the physical printer device. Laser modulation uses a controller to modulate the appearance of the final output image. Printed spots of the output image may be moved, shrunk, or reshaped to achieve a variety of effects. High addressability methods affect the horizontal resolution. For example, doubling printer modulation rate results in doubling the horizontal resolution, while keeping vertical resolution unchanged. New and improved techniques to increase image resolution have improved halftone image quality. Specifically, in the field of digital halftoning, different methods of converting continuous tone to binary images while preserving the appearance of tonal gradation or density similar to the original image have been disclosed.

The following patent, the pertinent portions of which are incorporated herein by reference, discloses a method for transforming gray video input information, with an interpolation function, into a binary high addressability output representation for later manipulation on binary high addressability output terminals, such as printers and displays:

---
US-A-5,274,472
Patentee: Williams
Issued: December 29, 1993
---

In one approach to high addressability output printing, images are stored in the form of image data, the image data being represented by pixels. To increase horizontal resolution, each pixel is divided into M subpixels by a conventional enhancement technique. In turn, for purposes of printing the M subpixels, a modulator for a raster output scanner receives the M subpixels at a given clock rate and outputs a single bit stream, to a raster output scanner (ROS), at a rate of N times greater than the given clock rate. It is believed that the increased clock rate is obtained by providing the modulator with two separate clocks, namely a first clock to "clock" the subpixels into the modulator and a second clock to clock out the subpixels at the clock rate that is N times the given clock rate.

Using two clocks in this manner is believed to be disadvantageous in two respects. First, using two rather than one clock increases unit manufacturing cost ("UMC") for each printing system with a modulator. Second, due to the electromagnetic interference between the clocks, each clock is preferably provided with a shielding structure. While the shield structure of the first clock may not be particularly costly, the shield structure for the clock combination is inevitably costly since the frequency of the second clock, by definition, must be N times greater than the frequency of the first clock. It would be desirable to provide a modulator which affords high addressability printing without needlessly increasing UMC and/or electromagnetic interference of an associated printer.

In accordance with a preferred embodiment of the present invention there is provided a printing system for printing an image on a substrate, the image being represented by a set of words with each word being modulated so as to produce a single bit stream, each of the words including M bits, comprising: a multi-phase clock generator, responsive to a clock signal with a first clock rate, for producing N phase signals; a data serializer, communicating with said multi-phase clock generator, for receiving the N phase signals and the word set, said data serializer processing each word of the word set, with the N phase signals, to produce the single bit stream, the single bit stream being outputted at a second clock rate with the second clock rate being greater than the first clock rate; and a print engine communicating with said data serializer and receiving the single bit stream, said print engine imaging the image on the substrate.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
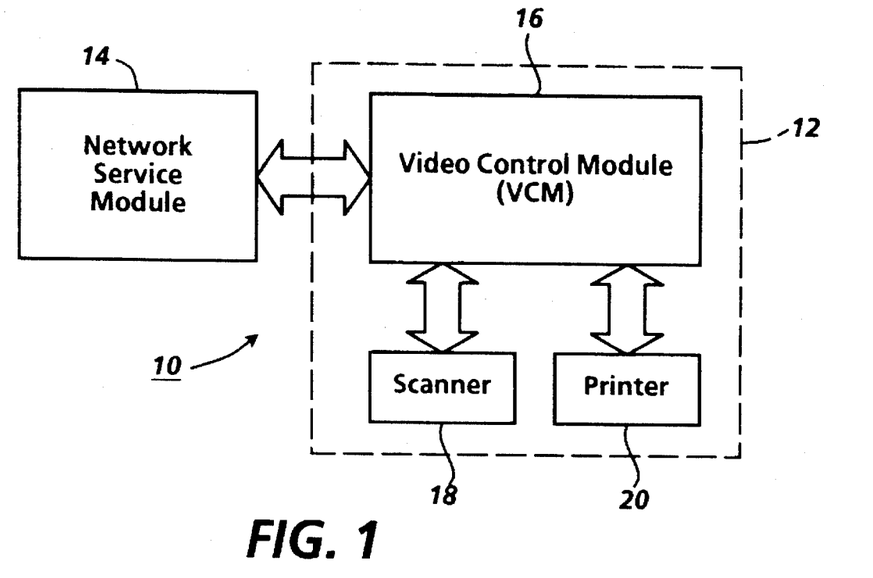
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
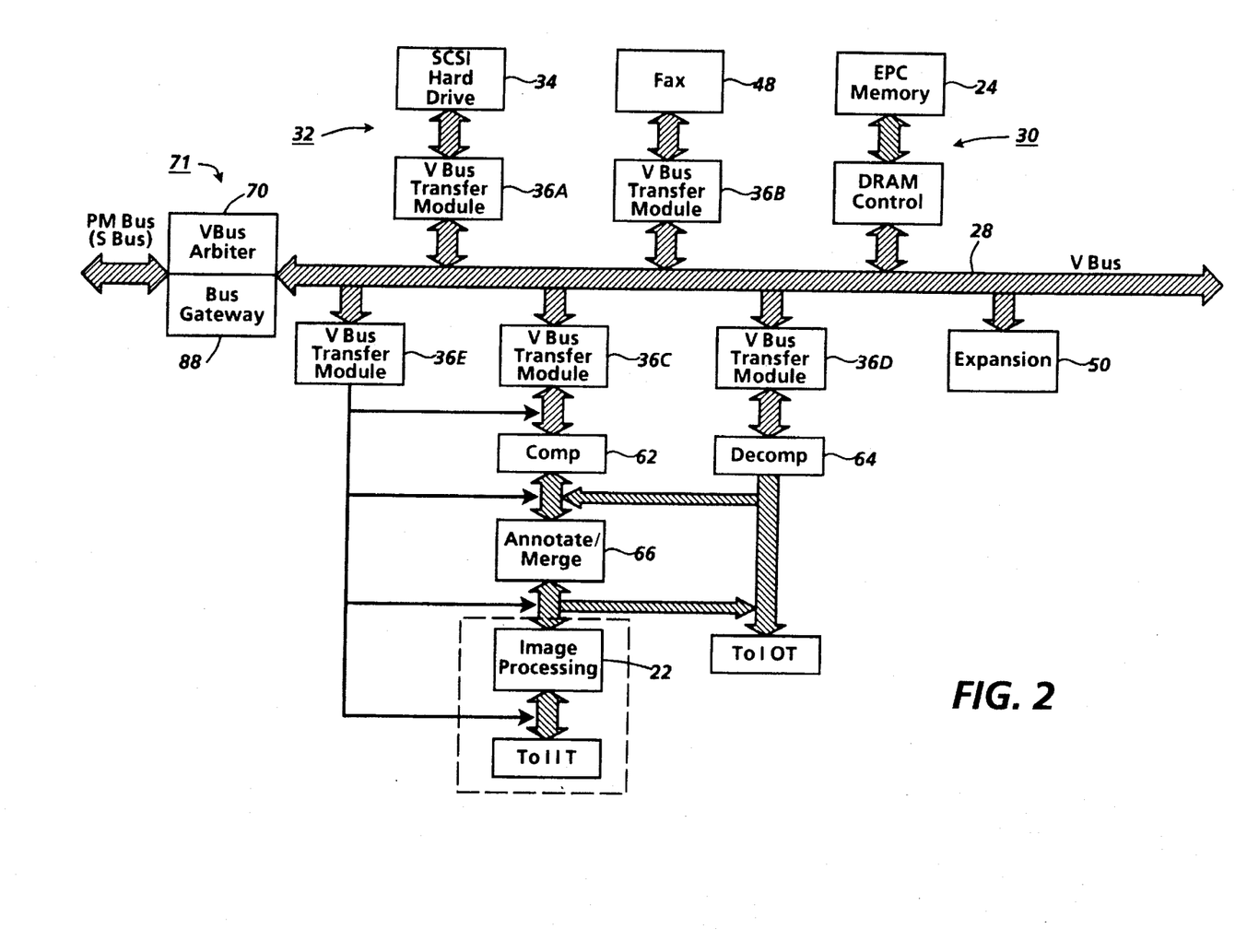
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
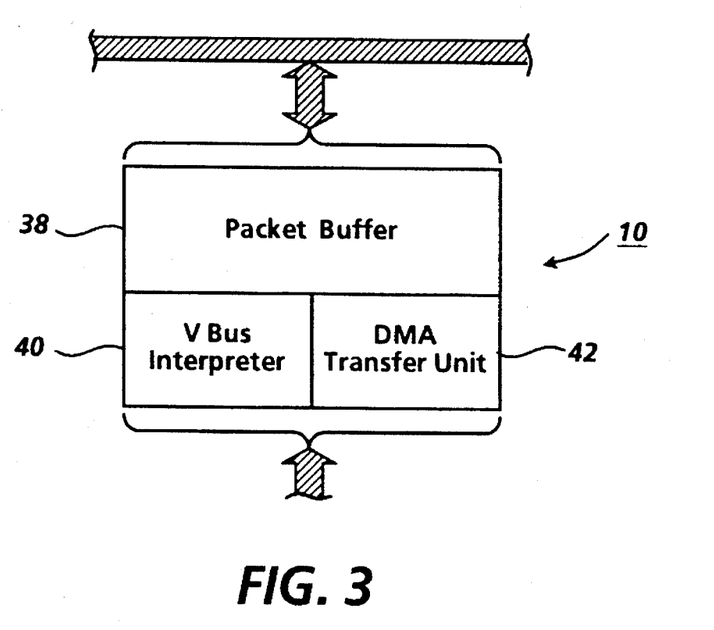
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes Preferably, the packet size would be reduced for times when the VBus is relatively busy and increased for times when activity on the bus is relatively low.

Figure 5:
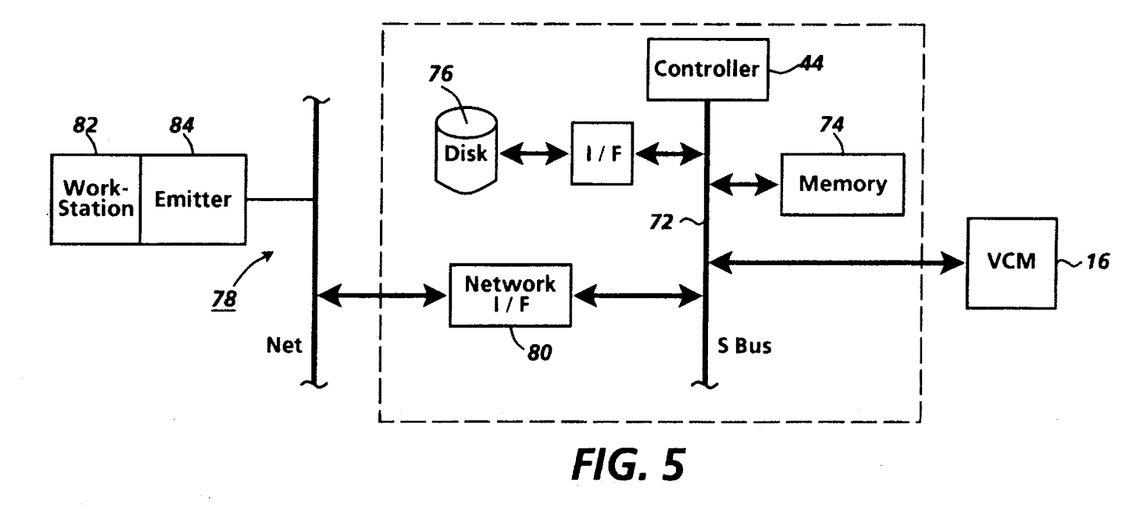
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, each imageThe DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
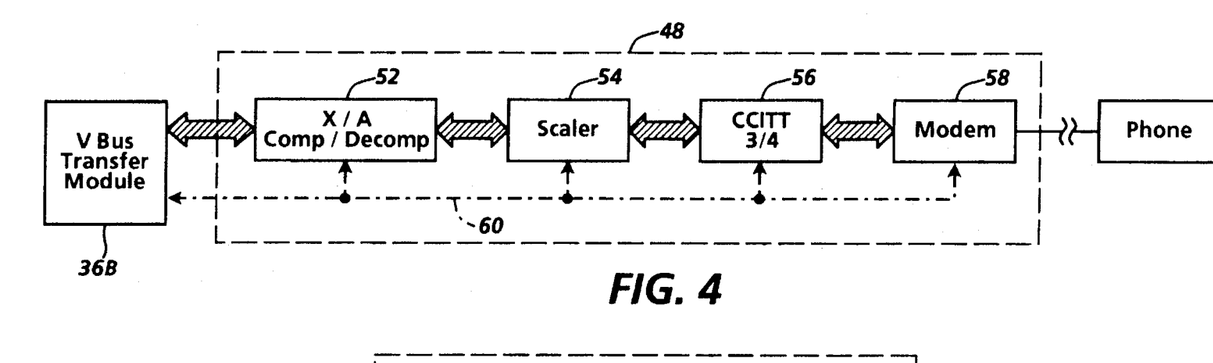
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adpative compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript ® Language Reference Manual
Second Edition
Addison-Wesley Publishing Co.
1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet mannner, as described immediately above.

Figure 6A:
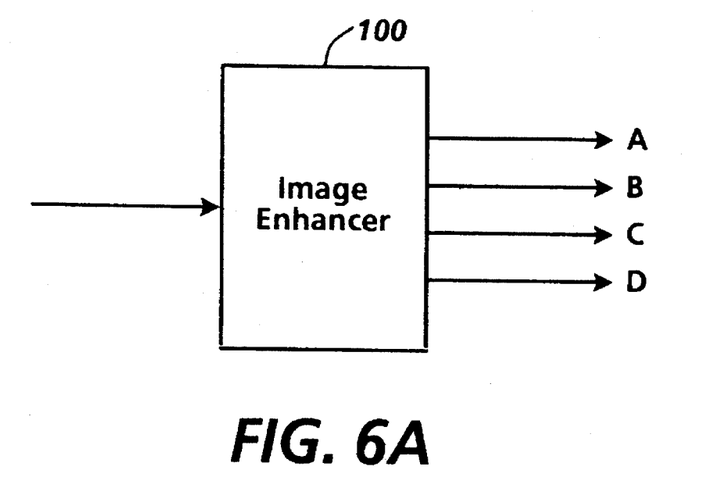
FIG. 6A is a block diagram of an apparatus for enhancing binary image data.

Referring to FIGS. 2 and 6A, the printer 20 includes an image processing section for performing such operations a smoothing. Smoothing, among other operations can be achieved by enhancing image data stored in the EPC memory 24 with an image enhancer 100. Preferably, the stored image data is represented by pixels and the image enhancer serves to divide each pixel into N subpixels. An approach for image enhancement is disclosed in U.S. Pat. No. 5,282,057 to Mailloux, the pertinent portions of which are incorporated herein by reference. While the image enhancer of FIG. 6A is shown as outputting four subpixels, the number of subpixels outputted could be more or less than four without affecting the concept upon which the disclosed embodiment is based.

Figure 6B:
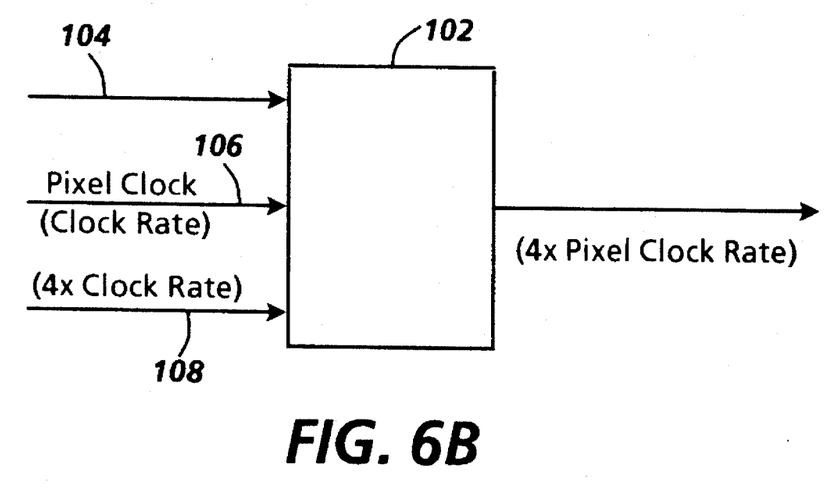
FIG. 6B is a block diagram of a high addressability modulator for modulating the enhanced image data produced by the image enhancer of FIG. 6A.

Referring to FIG. 6B, a technique, which is believed to be known, is discussed. In the illustrated embodiment of FIG. 6B, a high addressability modulator 102 receives the subpixels of image enhancer 100 via line 104, the line 104 being adapted to receive N bits. Additionally, the modulator 102 receives clock inputs via lines 106 and 108. Preferably, the input of clock line 108 is N times greater than the input of clock line 106. In operation, the bits of line 104 are clocked in by the clock input of line 106 and the clocked-in subpixels, represented by bits, are serialized and clocked out, with the clock input of line 108, at a rate that is N times greater than the clock rate of the the clock input of line 104. As indicated above in the background, this approach has the disadvantage of driving up both UMC and printing system cost.

Figure 7:
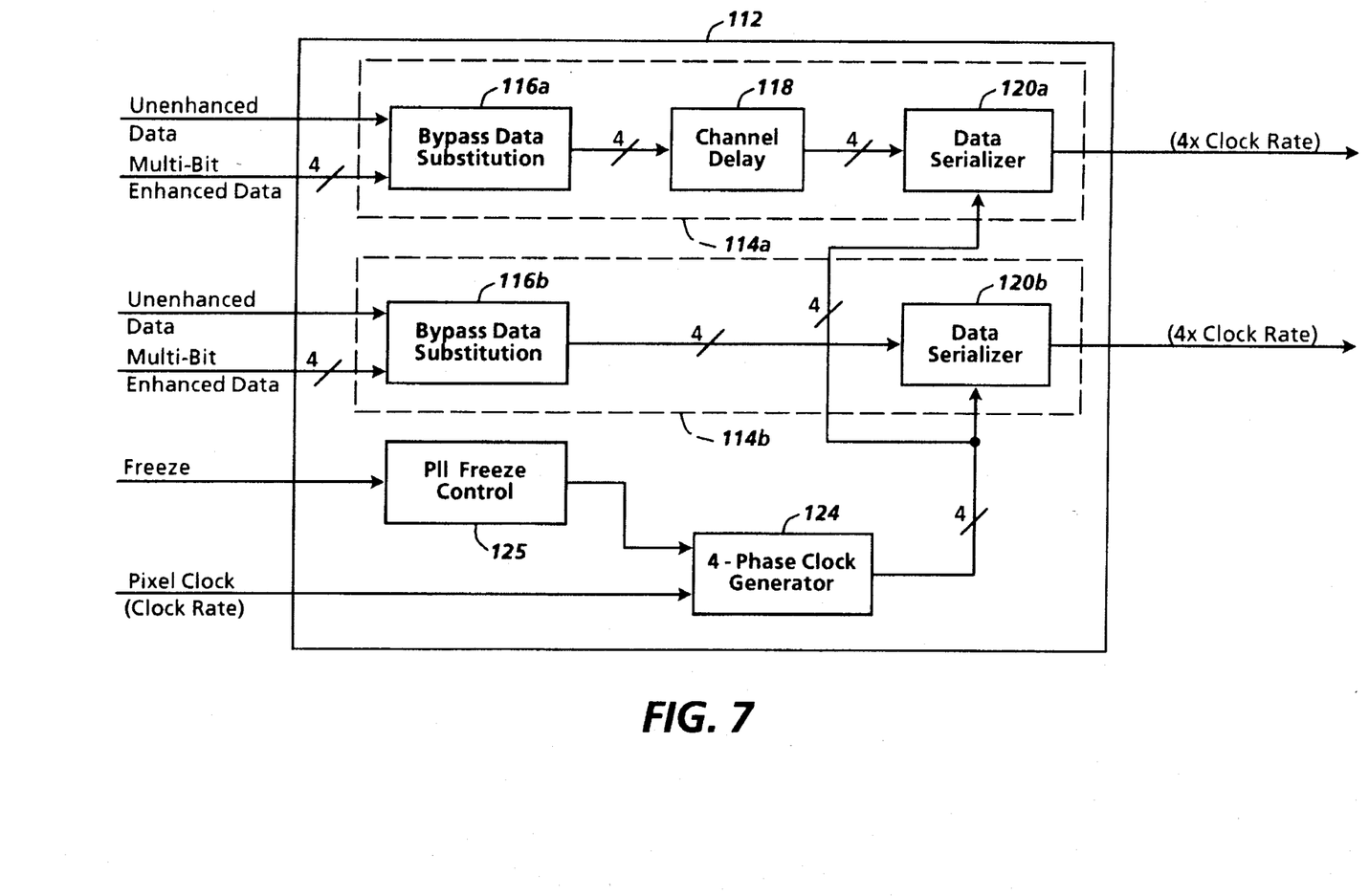
FIG. 7 is a block diagram of a high addressability modulator embodying the present invention.

Referring to FIG. 7, a preferred embodiment of a high addressability modulator is designated by the numeral 112. The modulator includes two sets of multi-bit inputs, a freeze control input and a pixel clock input. The two sets of multi-bit inputs, each of which includes N (e.g. 4) bits of either enhanced image data or N bits of unenhanced image data, are respectively provided to serializing circuits 114a and 114b. The serializing circuits include bypass data substitution circuits 116a and 116b, respectively. Generation of multi-bit enhanced image data is described above, with respect to the discussion of FIG. 6A, while the significance of the unenhanced image data and the bypass data substitution circuits will be discussed in further detail below.

It will be appreciated that two sets of image data are, in the preferred embodiment, provided because, as discussed above, the printer 20 preferably employs two laser diodes in order to produce prints. Thus, in the two laser diode embodiment, image data for driving two channels, and consequently two beams, are required. One of the sets of image data is passed through a channel delay, designated by the numeral 118, to compensate, if necessary, for fixed offset between the two beams in order to avoid skew. In one example, the channel delay is implemented with a set of logical delay components, such as a set of flip-flops (not shown). Each of the bypass data substitution circuits are operatively coupled with data serializers 120a and 120b, the significance of which will be discussed in further detail below. Since the basic concept underlying the structure of circuits 114a and 114b is similar, only one of the bypass data substitution circuits and one of the data serializers will be discussed below.

Each of the data serializers, as discussed in further detail below, receive inputs from an N (e.g. 4) phase clock generator, the clock generator being designated by the numeral 124. The phase clock generator communicates with a phase lock loop ("PLL") freeze controller 125, the significance of which will be discussed in further detail below. As will appear, the outputs of the data serializers are N (e.g. 4) times the clock rate of the pixel clock.

Figure 11:
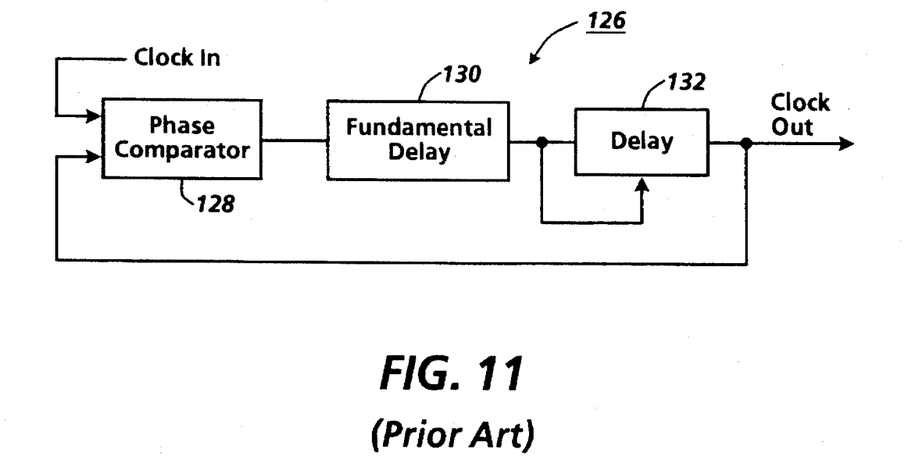
FIG. 11 is a block diagram depicting a prior art phase lock loop ("PLL") circuit.

Referring to the prior art drawing of FIG. 11, the concept underlying the structure and the operation of the four-phase clock generator is discussed in further detail. More particularly, the design of the clock generator 124 is based on a conventional PLL circuit 126 in which a clock input is delivered to a phase comparator 128. As is known the period of the clock output is subject to a fundamental delay 130 relative to the clock input. Accordingly, an adjustable delay 132 is added, in series, with the fundamental delay, to obtain a fixed relationship between the feedback of the clock output signal and the clock input.

Figure 12:
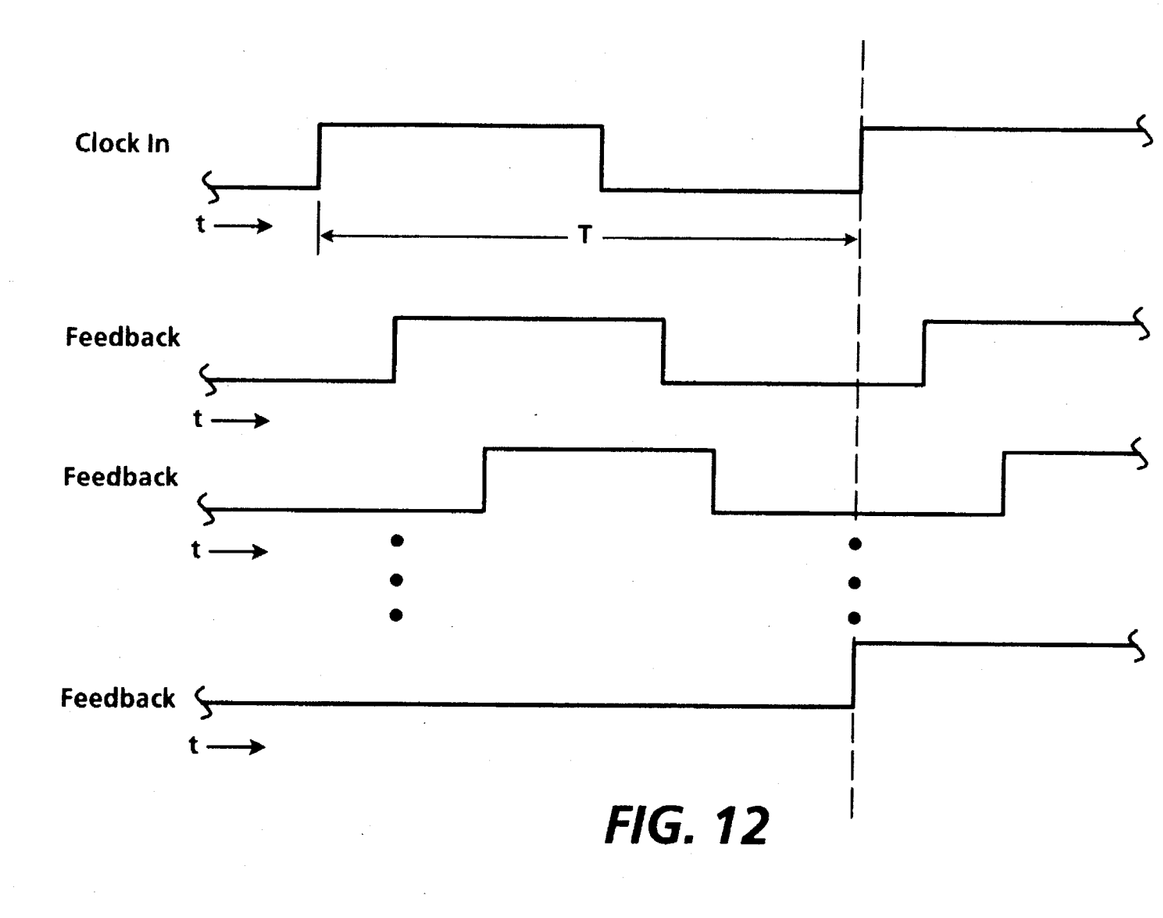
FIG. 12 is a timing diagram illustrating an operational mode of the PLL circuit of FIG. 11A.

To understand the operation of the PLL circuit 126, reference is made to the prior art drawing of FIG. 12. In one example, due to the existence of the fundamental delay, the period of the clock input is initially out of phase, relative to the feedback of the clock output, by an increment that is greater than 0° but less that 360°. To insure that the clock input and the feedback are in phase, the phase comparator incrementally adjusts the phase of the feedback until it is M×360°, where M is an integer value. In the example of FIG. 12, the value of M is 1.

Referring back to FIG. 8A, the concept underlying the PLL circuit 126 is used to implement the four-phase clock generator. As will appear from the discussion below, the clock generator could be modified readily to provide more or less than four phase outputs. The clock generator 124 includes the phase comparator 128 and the fundamental delay 130. Additionally, the clock generator 124 includes four adjustable delays 136a, 136b, 136c and 136d, each of which adjustable delays are coupled with one another in series. Adjustment of the adjustable delays is sequenced through use of a delay sequencer 138 which, in the illustrated embodiment of FIG. 8B is implemented by use of four flip-flops connected to one another in series. Bits $b_3$, $b_2$, $b_1$ and $b_0$ are preloaded, at power-up, with a 0001 pattern. In operation, sequencing is achieved by shifting the pattern represented by bits $b_0$, $b_1$, $b_2$ and $b_3$.

Figure 8A:
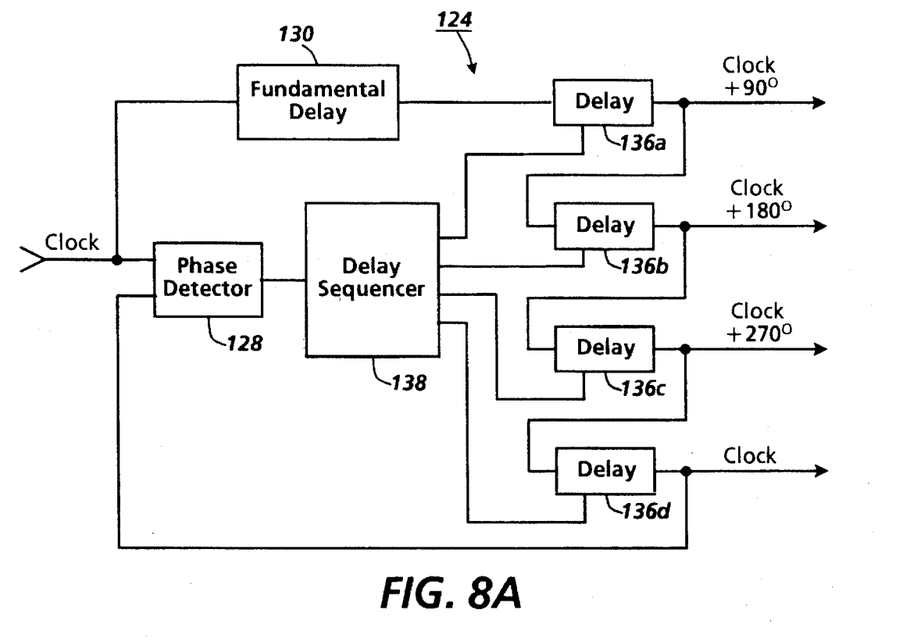
FIG. 8A is a block diagram embodying the four-phase clock generator of FIG. 7.
Figure 8B:
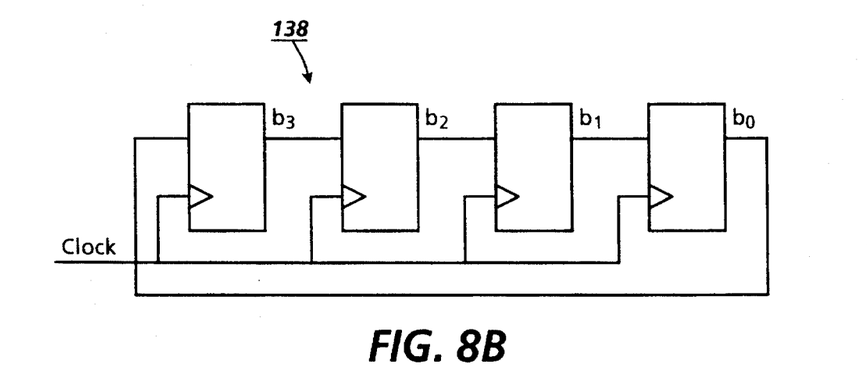
FIG. 8B is a block diagram embodying a delay sequencer of the high addressability modulator of FIG. 8A.
Figure 9:
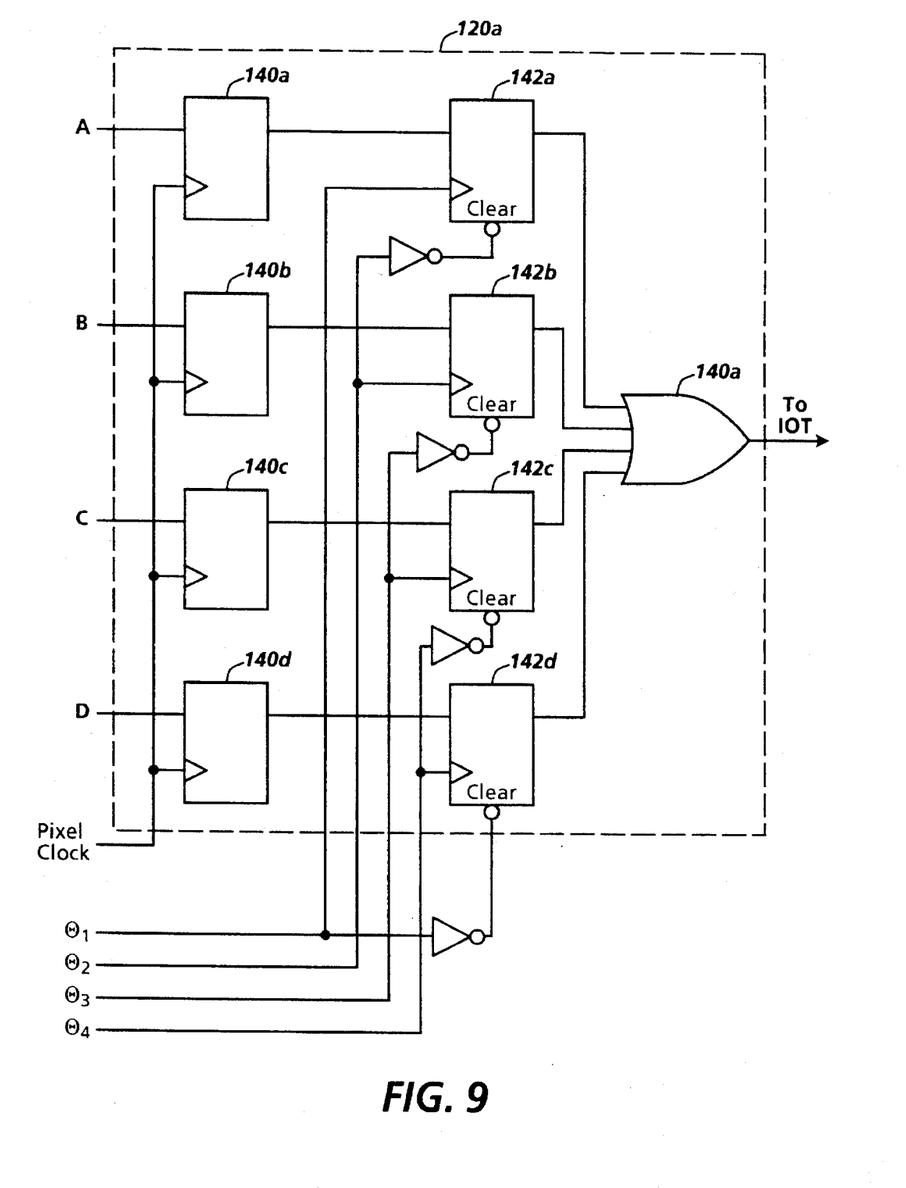
FIG. 9 is a preferred embodiment of a serializer shown in FIG. 7, the serializer communicating with outputs of the four-phase clock generator of FIG. 8A.

In the illustrated embodiment of FIG. 8A, the outputs of the four adjustable delays represent phase-delayed pixel clock signals. Referring to FIG. 9, the phase-delayed pixel clock signals (referred to below as "phase signals") are delivered to the serializer 120a. As illustrated in FIG. 7, preferably, the outputs of the phase clock generator are delivered, in parallel, to the serializers 120. It is believed that adjustment of the delays 136, during printing of image data with the high addressability modulator, could, under certain circumstances, cause artifacts in a resulting print. To avoid this possibility, a PLL freeze control 126 (FIG. 7) is used to halt adjustment of the delays 136 when a selected signal is detected at the freeze control. In one example, such signal would include either an image or line sync signal generated as a result of a copy or print operation being initiated.

The illustrated serializer 120a (FIG. 9) includes two sets of logical delay components, such as first set of flip-flops 140a, 140b, 140c and 140d as well as second set of flip-flops 142a, 142b, 142c and 142d. It will be appreciated by those skilled in the art that delay components other than flip-flops could be employed without affecting the concept upon which the disclosed embodiment is based. Preferably, the first set of flip-flops, which communicate with the pixel clock, are used to clock in, and temporarily store, the output of the image enhancer 100 (FIG. 6A). The outputs of the first set of flip-flops, in conjunction with the phase signals, are communicated to the second set of flip-flops, each of which second set flip-flop is provided with clearing functionality. The output of each second set flip-flop is communicated to the input of an OR gate 144.

In operation, the output of each second set flip-flops is set initially to be zero. Subsequently, the output signal of 140a is directed to the flip-flop 142a and transmitted, by the rising edge of the first phase signal, namely $\Phi_1$, to the OR gate 144. At a next clock pulse, the flip-flop 142a is cleared with the second phase signal $\Phi_2$ while the output of flip-flop 142b is transmitted by the rising edge of the second phase signal $\Phi_2$, to the OR gate. In a manner similar to that described above, the respective outputs for flip-flops 142c and 142d are delivered, in sequence, to the OR gate. It will be recognized that, due to the construction of the serializer, and the manner in which it is operated, only one subpixel signal is delivered to the OR gate 144 at a time. The process of clocking signals sequentially from the second flip-flops to the OR gate 144 is repeated for each set of subpixel bits delivered to the serializer 120a.

Figure 10:
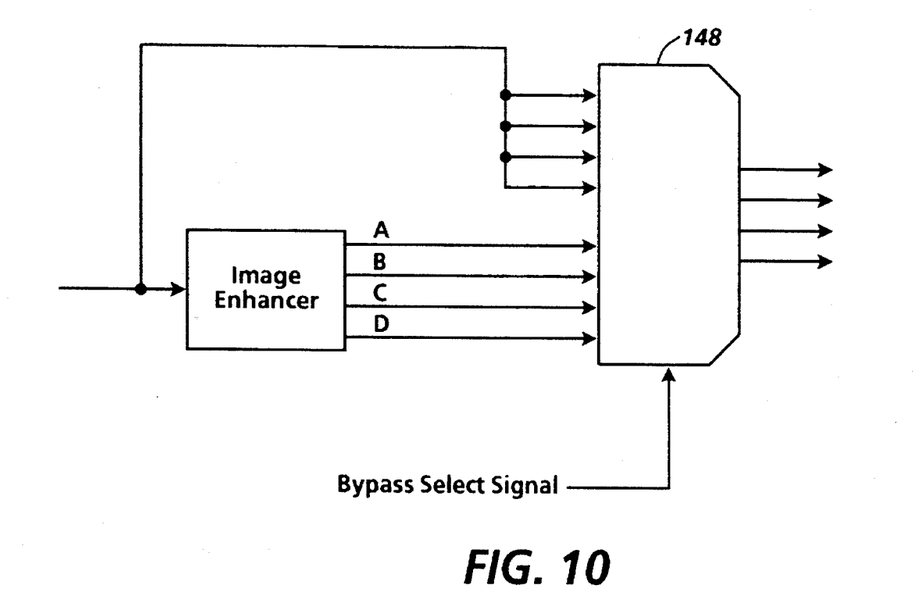
FIG. 10 is a schematic, block diagrammatic view of one of the bypass data substitution circuits of FIG. 7.

Referring to FIG. 10, one of the bypass data substitution circuits 116 is discussed in further detail. As can be recognized from the illustrated embodiment of FIG. 10, the bypass data substitution circuit, which, in one example, includes a 2 to 1 by 4 multiplexer 148, permits unenhanced binary data to be delivered directly to the ROS of the printer 20. More particularly, each pixel, by way of its attendant subpixel, is delivered to the multiplexer 148 by way of two parallel routes. In the first route, the pixel is delivered to the image enhancer 100 where N subpixels are generated by any conventional approach. Subsequently, the enhanced image data is communicated to one of the input sets of the multiplexer. In a second route, the pixel is expanded into N bit transmission for delivery to another input set of the multiplexer 148. In response to a bypass select signal, either the expanded data or the enhanced data is outputted from the multiplexer 148 to the ROS. In one example, a technician causes the expanded data to be transmitted through the multiplexer for performing diagnostics free of image enhancement. In a default mode, the enhanced data would be permitted to pass through the multiplexer.

Numerous features of the above-disclosed embodiment will be appreciated by those skilled in the art: First, in using a multi-phase clock generator, instead of a high frequency clock, cost savings are achieved. In particular, the unit manufacturing cost of the multi-phase clock generator is considerably less than the type of high frequency clock that would be required to achieve comparable performance. Moreover, the multi-phase clock generator alleviates the need to use an extensive amount of relatively expensive shielding.

Second, operation of the high addressability, and more particularly the multi-phase clock generator, does not interfere with imaging operations performed by the printer. More particularly, the multi-phase clock generator includes a series of delays disposed in series. To obtain suitable phase signals, the delays may be, for a given time interval, adjusted in sequence. During the imaging process, adjustment of the delays may be inhibited so as to eliminate the possibility of generating artifacts in resulting prints.

Third, the high addressability modulator provides a way to print enhanced image data with a typical xerographic print engine. In particular, a pixel is divided into a plurality of subpixels, i.e. a multi-bit word and, in turn, the high addressability modulator permits the subpixels to be reproduced with a selectable, e.g. a ROS. This approach can be used advantageously to increase horizontal resolution in a resulting output image without adjusting the ROS.

Fourth, the disclosed high addressability modulator allows for operation over a broad range of clock frequencies. In particular, a phase lock loop technique insures that as the clock frequency is adjusted, each phase signal is maintained within an acceptable tolerance.

Fifth, the high addressability modulator possesses a simple design that is readily scalable to various types of print engines. In particular, the modulator can be used with raster output scanning devices of both single and dual channel types.

Finally, the modulator can be operated in at least two modes, namely in a high addressable mode and a bypass mode. That is, in one mode, enhanced image data is delivered to the addressability modulator, and, in a bypass mode, unenhanced, binary data is delivered directly to the ROS.

What is claimed is:

1. A printing system for printing an image on a substrate, the image being represented by a set of words with each word being modulated so as to produce a single bit stream, each of the words including M bits, comprising:

a multi-phase clock generator, responsive to a clock signal with a first clock rate, for producing N phase signals;

a data serializer, communicating with said multi-phase clock generator, for receiving the N phase signals and the word set, said data serializer processing each word of the word set, with the N phase signals, to produce the single bit stream, the single bit stream being outputted at a second clock rate with the second clock rate being greater than the first clock rate; and a print engine communicating with said data serializer and receiving the single bit stream, said print engine imaging the image on the substrate.

2. The printing system of claim 1, wherein M=N.

3. The printing system of claim 1, wherein the second clock rate is N times greater than the first clock rate.

4. The printing system of claim 1, wherein said serializer includes a circuit of logical components for combining each word of M bits with the N phase signals to produce N outputs.

5. The printing system of claim 4, wherein said data serializer includes a logical device for combining the N outputs to form the single bit stream.

6. The printing system of claim 4, wherein said circuit of logical components includes N delay devices, each of which said N delay devices receives one of the M bits and one of the N phase signals.

7. The printing system of claim 6, in which said N delay devices include a first delay device and a second delay device with each of said first delay device and said second delay device including a clearing function for clearing a bit written thereto, wherein:

one of the N phase signals is transmitted to each of said first and second delay devices; and said first delay device is cleared with the one of the N phase signals.

8. The printing system of claim 1, wherein said multi-phase clock generator includes N delay devices coupled with one another in a serial manner so that a first one of said delay devices receives the clock signal and the N phase signals are produced respectively by said N delay devices.

9. The printing system of claim 8, in which each of said N delay devices is adjustable, wherein said multi-phase clock generator includes a phase comparator, said phase comparator receiving a feedback signal from a second one of said N delay devices and using the feedback signal to adjust said N delay devices.

10. The printing system of claim 9, further including a delay sequencer, communicating with each of said phase comparator and said N adjustable delay devices, for controlling a sequence in which said N adjustable delay devices are adjusted.

11. The printing system of claim 7, further including a control circuit, communicating with said phase comparator for inhibiting adjustment of said N adjustable delay devices for a selected time interval.

12. The printing system of claim 11, wherein said control circuit is responsive to a signal issued by said printing system whenever a print is to be produced.

13. The printing system of claim 1, further comprising a second data serializer, communicating with both said multi-phase clock generator and said print engine, for receiving the N phase signals and the word set, said first and second data serializers driving said print engine, in parallel, to achieve the imaging of the image on the substrate.

14. A high addressability modulator for modulating each word in a set of words so as to produce a single bit stream, each of the words including M bits, comprising:

a multi-phase clock generator, responsive to a clock signal with a first clock rate, for producing N phase signals;

a data serializer, communicating with said multi-phase clock generator, for receiving the N phase signals and the word set, said data serializer processing each word of the word set, with the N phase signals, to produce the single bit stream, the single bit stream being outputted at a second clock rate with the second clock rate being greater than the first clock rate.

15. The high addressability modulator of claim 14, wherein: M=N.

16. The high addressability modulator of claim 14, wherein the second clock rate is N times greater than the first clock rate.

17. The high addressability modulator of claim 14, wherein said serializer includes a circuit of logical components for combining each word of M bits with the N phase signals to produce N outputs.

18. The high addressability modulator of claim 17, wherein said circuit of logical components includes a logical device for combining the N outputs to form the single bit stream.

19. The high addressability modulator of claim 17, wherein said circuit of logical components includes N delay devices, each of which said N delay devices receives one of the M bits and one of the N phase signals.

20. The high addressability modulator of claim 19, in which said N delay devices include a first delay device and a second delay device with each of said first delay device and said second delay device including a clearing function for clearing a bit written thereto, wherein:

one of the N phase signals is transmitted to each of said first and second delay devices; and said first delay device is cleared with the one of the N phase signals.

21. The high addressability modulator of claim 14, wherein said multi-phase clock generator includes N delay devices coupled with one another in a serial manner so that a first one of said delay devices receives the clock signal and the N phase signals are produced respectively by said N delay devices.

22. The high addressability modulator of claim 21, in which each of said N delay devices is adjustable, wherein said multi-phase clock generator includes a phase comparator, said phase comparator receiving a feedback signal from a second one of said N delay devices and using the feedback signal to adjust said N delay devices.

23. The high addressability modulator of claim 22, further including a delay sequencer, communicating with each of said phase comparator and said N adjustable delay devices, for controlling a sequence in which said N adjustable delay devices are adjusted.

24. A method of modulating each word in a set of words so as to produce a single bit stream, each of the words including M bits, comprising:

transmitting a clock signal, having a first clock rate, to a multi-phase clock generator;

producing, with the multi-phase clock generator, N phase signals;

processing each word of the word set with the N phase signals to produce the single bit stream, the single bit stream being outputted at a second clock rate with the second clock rate being greater than the first clock rate.

25. The method of claim 24, wherein said processing step includes combining each word of M bits with the N phase signals to produce N outputs.

26. The method of claim 25 wherein said processing step includes combining the N outputs to form the single bit stream.

27. The method of claim 24, wherein said producing step includes coupling N delay devices with one another in a serial manner so that a first one of the N delay devices receives the clock signal and the N phase signals are produced respectively by the N delay devices.

28. The method of claim 27, in which each of the N delay devices is adjustable and the multi-phase clock generator includes a phase comparator, said producing step including:

transmitting a feedback signal from a second one of the N delay devices to the phase comparator; and adjusting the N delay devices with the phase comparator.

* * * * *